United States Patent [19]

Prichard

[11] Patent Number: 4,796,922
[45] Date of Patent: Jan. 10, 1989

[54] SUBSEA MULTIWAY HYDRAULIC CONNECTOR

[75] Inventor: Richard M. H. Prichard, Katy, Tex.

[73] Assignee: Vetco Gray Inc., Houston, Tex.

[21] Appl. No.: 139,686

[22] Filed: Dec. 30, 1987

[51] Int. Cl.$^4$ .............................................. F16L 35/00
[52] U.S. Cl. ..................... 285/26; 285/379; 285/910; 285/917; 277/233; 277/235 R
[58] Field of Search ................ 285/26, 131, 110, 379, 285/261, 917, 910, 135, 325; 277/233, 234, 235, 238, 205, 179

[56] References Cited

U.S. PATENT DOCUMENTS

| | | | |
|---|---|---|---|
| 3,217,922 | 11/1965 | Glasgow | 285/917 X |
| 3,233,921 | 2/1966 | Holmgren et al. | |
| 3,381,968 | 5/1968 | Neilson | 277/235 X |
| 3,469,709 | 9/1969 | Furgason et al. | 277/233 X |
| 3,567,258 | 3/1971 | Scaramulli | 285/349 X |
| 3,680,895 | 8/1972 | Herbert et al. | |
| 3,957,291 | 5/1976 | Edling et al. | 285/261 X |
| 4,103,939 | 8/1978 | Herbert et al. | |
| 4,263,243 | 4/1981 | Wilson et al. | |
| 4,519,636 | 5/1985 | Tomlin et al. | 285/26 X |
| 4,616,857 | 10/1986 | Woodman | 285/26 X |

Primary Examiner—Dave W. Arola
Attorney, Agent, or Firm—James E. Bradley

[57] ABSTRACT

A hydraulic connector for a subsea well assembly has spherical hydraulic seats. Each seat has the same radius of curvature in a vertical direction as in a horizontal direction. Each connector member has a plurality of hydraulic passages, each hydraulic passage having a port terminating at the hydraulic seat. The ports of one of the connector members register with the ports of the other connector member. A counterbore is located at the port of each hydraulic passage of the one connector member, defining a recessed base. A seal element is located in each counterbore. The seal element is frusto-conical and is formed of a plurality of conical metal and elastomer laminations alternating with each other.

5 Claims, 2 Drawing Sheets

SUBSEA MULTIWAY HYDRAULIC CONNECTOR

BACKGROUND OF THE INVENTION

1. Field of the Invention

This invention relates in general to subsea wells, and in particular to hydraulic connectors for connecting hydraulic lines in a subsea well to a surface vessel or other subsea equipment.

2. Description of the Prior Art

Offshore drilling and well production systems generally have hydraulic or electro-hydraulic control systems for operating the subsea functions. Subsea completions, for example, almost invariably have hydraulically operated tree connectors and valves. Hydraulic connectors are used to connect a subsea tree to its wellhead, a riser to a blowout preventer stack, and hydraulic control lines to the tree valves.

Two predominant types of hydraulic connectors are used. In one type, individual pin and box connectors are used. In the other or multiway type, a mandrel or upper connector member inserts into a receptacle or lower connector member. The mandrel has a hydraulic seat with a plurality of passages terminating in ports at the hydraulic seat. These ports align with ports in the receptacle to transmit hydraulic fluid.

The typical multiway connector includes a conical hydraulic seat. The conical male mandrel fits into a corresponding conical female receptacle. The male mandrel has a number of hydraulic ports, each of which is surrounded by an elastomeric seal, which is secured by a threaded retainer. The elastomeric seal is reinforced with an internal metal ring. The female receptacle has internal hydraulic ports which correspond in position to the ports on the mandrel when the mandrel is engaged. A keyway or pin is used to insure proper orientation of the mandrel in relation to the receptacle.

While successful, the conical hydraulic seat surfaces require a complex curvature on the face of the seal element. While this is not a significant problem for elastomers, it would be very difficult to use for metal-to-metal seals. While elastomer seals have many advantages, they have a limited life, do not withstand high temperatures, and are more readily attacked by certain fluids than a metal seal.

SUMMARY OF THE INVENTION

In this invention, a laminated metal/elastomer seal element is used. The seal element is conical and has a passage through it for the passage of the hydraulic fluid. The seal element is located in a counterbore in one of the hydraulic seats. The seal element is slightly greater in height than the depth of the counterbore so that it protrudes out and is compressed against the other hydraulic seat. The seal element is made up of conical metal and elastomer laminations bonded together. The ends of the elastomer laminations protrude slightly past the ends of the metal laminations to result in a combination metal and elastomer seal.

The hydraulic seats are portions of a sphere. Generally, the lower hydraulic seat is convex, while the other hydraulic seat is concave. However, in certain cases, the upper hydraulic seat may be convex while the other is concave. The hydraulic connector for a subsea control module is such a case. Having the same radius in a vertical direction as in a horizontal direction allows the face of the seal element to be uniform in all directions. Therefore, the seal is a solid of revolution.

DESCRIPTION OF THE PREFERRED EMBODIMENT

Figure 1:
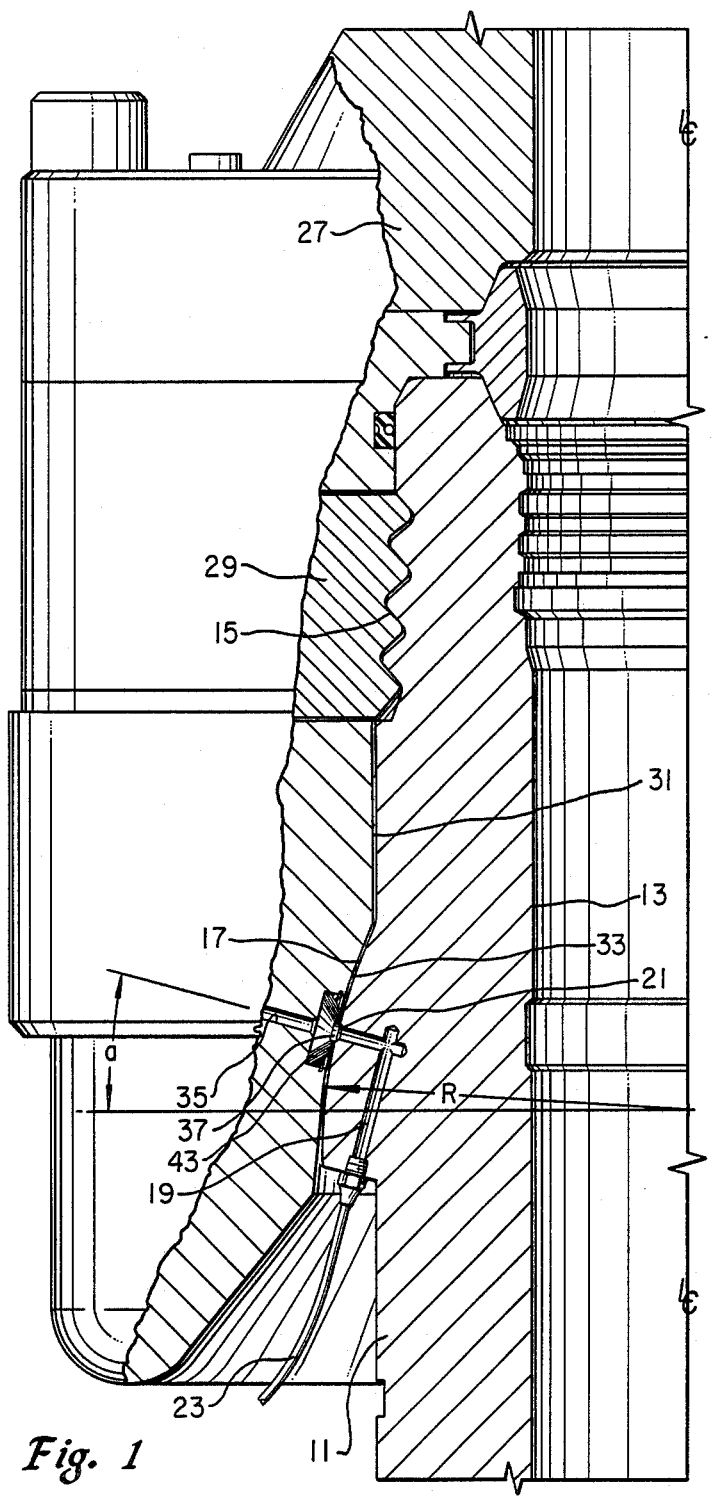
FIG. 1 is a partial vertical sectional view of a mandrel and mandrel connector constructed in accordance with this invention.

Referring to FIG. 1, a tubular mandrel 11 is shown. Mandrel 11 is a stationary part of a subsea well assembly. It is tubular, having a bore 13 extending longitudinally through it. A plurality of circumferential grooves 15 are formed on the exterior sidewall of mandrel 11.

A mandrel hydraulic seat 17 is formed on the sidewall of the mandrel 11. Hydraulic seat 17 is located below the grooves 15. Hydraulic seat 17 is a convex surface that faces generally upward and outward. It is a portion of a true sphere. The radius R that forms the curvature in the vertical direction is the same as the radius that forms the curvature in the horizontal direction. The centerpoint of radius R is thus located on the centerline of the bore 13. The vertical distance from the top of the hydraulic seat 17 to the bottom of the hydraulic seat 17 is proportional to about 20 to 30 degrees.

A plurality of hydraulic passages 19 (only one shown) are formed through the mandrel 11. Each passage 19 terminates in a port 21 located on the face of the hydraulic seat 17. The ports 21 are spaced circumferentially around the mandrel 11. Each hydraulic passage 19 is connected to a hydraulic line 23 that leads to or from one of the various control valves on the subsea well assembly. The ports 21 are located at a point on a hydraulic seat 17 that is on a line located at an angle a above a horizontal line passing through the centerpoint of the radius R. This angle a is preferably 10 to 15 degrees.

A mandrel connector 27 is connected to a riser (not shown) and lowered from a vessel or platform at the surface. The mandrel connector 27 may also be connected to a subsea tree, blow-out preventer or other retrievable unit. The mandrel connector 27 is a receptacle that slides over the mandrel 11. Mandrel connector 27 has a plurality of dogs 29 which locate within the grooves 15. The dogs 29 are part of a connection means that includes a piston and cam (not shown) that move the dogs radially inward into engagement with the mandrel grooves 15. Once engaged, the dogs 15 will rigidly lock the mandrel connector 27 to the mandrel 11. The mandrel connector 27 has a bore 31 that is generally cylindrical and fits around the sidewall of the mandrel 11.

A connector hydraulic seat 33 is formed on the bore 31. The hydraulic seat 33 faces generally inward and slightly downward. Hydraulic seat 33 is concave. It is also a portion of the sphere. This radius is the same as the radius R. The curvature in the vertical direction is the same as the curvature in the horizontal direction.

Figure 2:
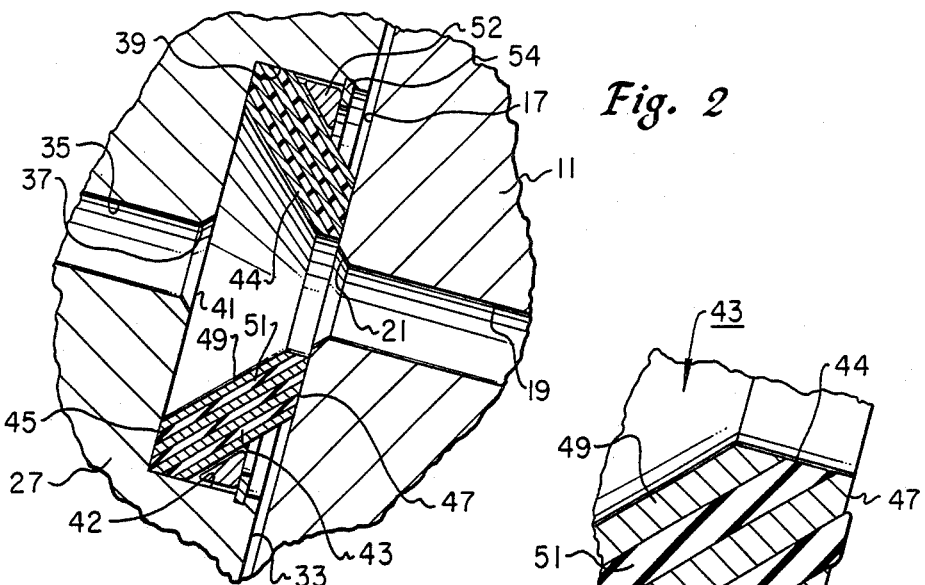
FIG. 2 is an enlarged partial sectional view of one of the seal elements used with the mandrel connector of FIG. 1.

The connector hydraulic seat 33 has a plurality of hydraulic passages 35 extending through it. The passages 35 each terminate in a port 37 at the face of the hydraulic seat 33. The hydraulic passages 35 are connected to hydraulic lines (not shown) that lead to the surface vessel. The hydraulic lines may also lead to a riser, subsea tree, blow-out preventoer or other retrievable unit. Referring to FIG. 2, port 37 of each hydraulic passage 35 has an enlarged counterbore 39 formed in it. Counterbore 39 defines a flat base 41 and a cylindrical sidewall 42.

A seal element 43 is carried in each counterbore 39. Each seal element 43 has a frusto-conical configuration. It has a passage 44 extending through it for allowing the passage of fluid between the hydraulic passages 19 and 35. The seal element 43 has a base 45 that is annular and flat. The diameter of the base 45 is considerably larger than the apex or face 47. The face 47 is uniform in horizontal and vertical directions and preferably substantially flat. The height of the seal element 43 is slightly greater than the depth of the counterbore 39. This protrusion causes the seal element 43 to seal against the hydraulic seat 17.

Figure 3:
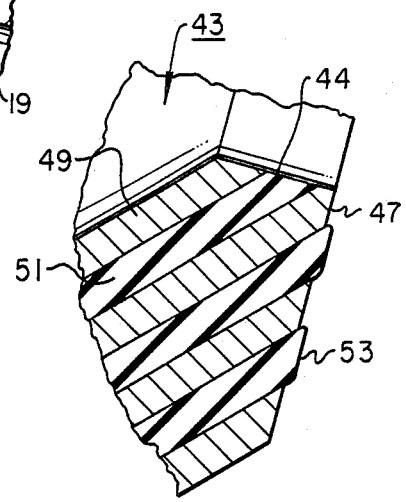
FIG. 3 is a further enlarged view showing a portion of one of the seal elements of FIG. 2.

Seal element 43 is a laminated member. It has frusto-conical metal laminations 49 and elastomer laminations 51. Each elastomer lamination 51 is sandwiched between two of the metal laminations 49. The laminations 49, 51 are bonded to each other. As shown in FIG. 3, the ends 53 of the elastomer laminations 51 initially protrude slightly beyond the ends of the metal laminations 49. The protrusion occurs both on the face 47 and the base 45. This protrusion may be accomplished by etching the metal laminations 49. The protrusion causes sealing of the elastomer lamination 51 against the hydraulic seat 17. The seal element 43 is retained by an annular spacer 52 and a retaining ring 54.

In the operation of the embodiments of FIGS. 1–4, the mandrel connector 27 is lowered from the surface vessel. The seal elements 43 will be retained by the retaining rings 54. The seal elements 43 initially protrude from the counterbore 39 (FIG. 2). Also, as shown in FIG. 3, initially the ends 53 of the elastomer laminations 51 protrude past the metal laminations 49.

The mandrel connector 27 will be oriented and landed on the mandrel 11. Each port 35 will align with a port 21. The hydraulic seats 17 and 33 will contact each other. The dogs 29 are actuated to move in and rigidly connect the mandrel connector 27 to the mandrel 11.

Figure 4:
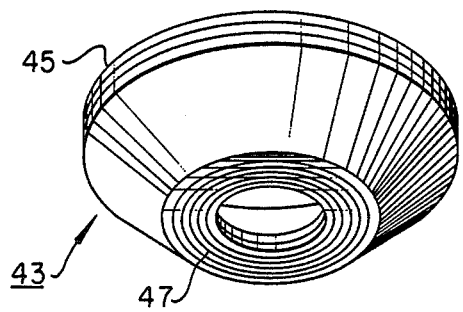
FIG. 4 is a perspective view of one of the seal elements of FIG. 2.

The seal element 43 will be compressed between the base 41 and hydraulic seat 17, as shown in FIG. 4. This deforms the ends 53 of the elastomer. The metal laminations 49 are also compressed between the base 41 and the hydraulic seat 17. This results in a metal-to-metal seal being caused by the metal laminations 49. An elastomer to metal seal is caused by the elastomer laminations 51. Although the seat 17 is spherical, because of the large radius of the seat 17 relative to the diameter of each seal face 47, sealing occurs even though the seal face 47 is substantially flat.

Figure 5:
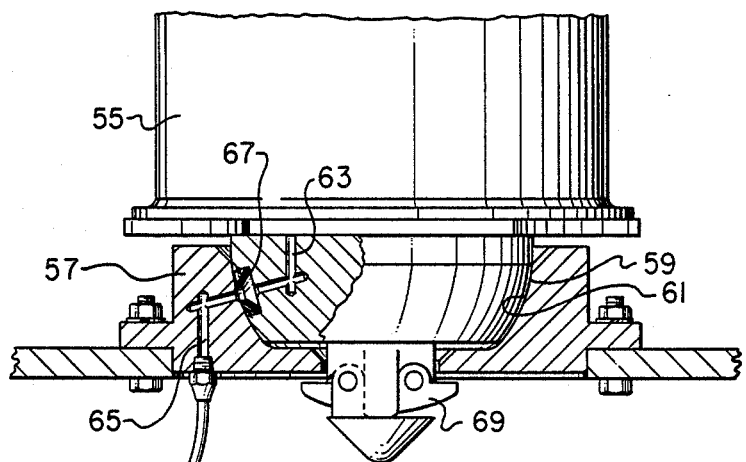
FIG. 5 is a view of an alternate embodiment of a hydraulic connector constructed in accordance with this invention.

In FIG. 5, the same principle is applied to a control pod 55. Rather than making the hydraulic connections up surrounding the mandrel 11, as shown in FIG. 4, the control pod 55 is separately lowered from the surface to make up the hydraulic connections. The control pod 55 lands in a receptacle 57 located on a subsea well assembly. The control pod 55 has a convex hydraulic seat 59 that is portion of a sphere. The receptacle 57 has a mating hydraulic seat 61, which is also a portion of a sphere.

A plurality of hydraulic passages 63 extend through the hydraulic seat 59. Similarly, a plurality of hydraulic passages 65 extend through the hydraulic seat 61. Seal elements 67 are the same type as shown in FIG. 2 and are located at the port of each hydraulic passage 63. Each hydraulic passage 63 terminates at a point that is about 10 to 15 degrees below a horizontal line passing through the centerline of the hydraulic seat 59. A latch 69 on the lower end of the control pod 55 is actuated by an internal mechanism. Latch rigidly secures the control pod 55 to the receptacle 57.

In the operation of the FIG. 5 embodiment, the control pod 55 is lowered into engagement with the receptacle 57. A latch 69 rigidly secures the control pod 55 to the receptacle 57. The seal element 67 form a seal for each passage 63, 65.

The invention has significant advantages. The metal and elastomer seal forms both a metal-to-metal and elastomer-to-metal seal. The elastomer portions have the advantage of an elastomer seal, which requires little preload compared to a metal seal. The elastomer laminations conform to the hydraulic seat surfaces, not requiring particularly close machining tolerances and tolerating minor surface imperfections. The metal laminations have the advantages of a metal seal in that they are resistant to well fluids and high temperatures. The spherical hydraulic seat avoids the need for complex faces of seals as in the prior art.

While the invention has been shown in only two of its forms, it should be apparent to those skilled in the art that it is not so limited, but is susceptible to various changes and modifications without departing from the scope of the invention.

I claim:

1. For a subsea well assembly, a hydraulic connector comprising in combination:

a pair of connector members, each having a hydraulic seat and a plurality of hydraulic passages, each hydraulic passage having a port terminating at the hydraulic seat;

means for coupling the connector members rigidly together, with the hydraulic seats seating against each other and the ports of one of the connector members registering with the ports of the other connector member;

a counterbore located at the port of each hydraulic passage of one of the connector members, defining a base recessed below the hydraulic seat of that connector member;

a seal element located in each counterbore, the seal element being generally frusto-conical and having a passage therethrough for the passage of hydraulic fluid from one of the ports of one of the connector members to another port of the other connector member, the seal element having a base in contact with the base of the counterbore and a face protruding out of the counterbore a short distance for compression against the hydraulic seat of the other connector member surrounding one of the ports when the connector members are coupled together; and the seal element being formed of at least one conical metal lamination and at least one elastomer lamination bonded to each other, the elastomer lamination having ends which protrude past ends of the metal lamination a short distance prior to the coupling of the connector members together.

2. For a subsea well assembly, a hydraulic connector comprising in combination:
   a pair of connector members, each having a hydraulic seat and a plurality of hydraulic passages, each hydraulic passage having a port terminating at the hydraulic seat;
   means for coupling the connector members rigidly together, with the hydraulic seats seating against each other and the ports of one of the connector members registering with the ports of the other connector member;
   a counterbore located at the port of each hydraulic passage of one of the connector members, defining a recessed base; and
   a seal element located in each counterbore, the seal element being generally frusto-conical and having a passage therethrough for the passage of hydraulic fluid from one of the ports of one of the connector members to another port of the other connector member, the seal element having a generally flat annular base in contact with the base of the counterbore and an annular face, the seal element being formed of a plurality of frusto-conical metal and elastomer laminations alternating with and bonded to each other, the elastomer laminations having ends initially protruding a short distance past the metal laminations at the base and at the face prior to the coupling of the connector members together, the height of the seal element being slightly greater than the depth of the counterbore for compressing the metal and elastomer laminations between the hydraulic seat of the other connector member and the base of the counterbore when the connector members are coupled together, to form a metal-to-metal and elastomer-to-metal seal.

3. For a subsea well assembly, a hydraulic connector comprising in combination:
   upper and lower connector members, the lower connector member being located stationarily on a subsea well assembly, the upper connector member being adapted to be lowered from a surface platform into engagement with the lower connector member;
   each connector member having a hydraulic seat that is a portion of a sphere, having the same radius of curvature in a vertical direction as in a horizontal direction, each connector member having a plurality of hydraulic passages, each hydraulic passage having a port terminating at the hydraulic seat;
   means for coupling the connector members rigidly together, with the hydraulic seats seating against each other and the ports of one of the connector members registering with the ports of the other connector member;
   a counterbore located at the port of each hydraulic passage of the upper connector member, defining a recessed base;
   a seal element located in each counterbore, the seal element being generally frusto-conical and having a passage therethrough for the passage of hydraulic fluid from one of the ports of one of the connector members to another port of the other connector member, the seal element having a generally flat annular base in contact with the base of the counterbore and an annular face, the seal element being formed of a plurality of conical metal and elastomer laminations alternating with each other, the elastomer laminations having ends initially protruding a short distance past ends of the metal laminations at the base and at the face prior to the coupling of the connector members together, the height of the seal element being slightly greater than the depth of the counterbore for compressing the metal and elastomer laminations between the hydraulic seat of the upper connector member and the base of the counterbore when the connector members are coupled together, to form a metal-to-metal and elastomer-to-metal seal; and
   retaining means for retaining the seal element in the counterbore prior to coupling the connector members together.

4. For a subsea well assembly, a hydraulic connector comprising in combination:
   upper and lower connector members, the lower connector member being located stationarily on a subsea well assembly, the upper connector member being adapted to be lowered from a surface platform into engagement with the lower connector member;
   each connector member having a hydraulic seat that is a portion of a sphere with the same radius of curvature in a vertical direction as in a horizontal direction, each connector member having a plurality of hydraulic passages, each hydraulic passage having a port terminating at the hydraulic seat;
   means for coupling the connector members rigidly together against relative movement, with the hydraulic seats seating against each other and the ports of one of the connector members registering with the ports of the other connector member;
   a counterbore located at the port of each hydraulic passage of the upper connector member, defining a recessed base;
   a seal element located in each counterbore and having a passage therethrough for the passage of hydraulic fluid from one of the ports of one of the connector members to another port of the other connector member, the seal element having a height slightly greater than the depth of the counterbore for compressing the seal element between the hydraulic seat of the upper connector member and the base of the counterbore when the connector members are coupled together; and
   retaining means for retaining the seal element in the counterbore prior to coupling the connector members together.

5. In a subsea well assembly having an upright tubular mandrel located stationarily on the subsea well assembly having a sidewall containing a plurality of circumferential grooves, a mandrel connector adapted to be lowered from a platform on the surface over the mandrel, connector means for rigidly connecting the mandrel connector to the grooves of the mandrel against relative movement, an improved means for connecting hydraulic lines at the subsea well assembly, comprising in combination:
   a mandrel hydraulic seat located on the side wall of the mandrel below the grooves, the mandrel hydraulic seat being convex and a portion of a sphere having the same radius of curvature in a vertical direction as in a horizontal direction;
   a plurality of hydraulic passages extending to a port terminating at the mandrel hydraulic seat;

a connector hydraulic seat mounted to the mandrel connector, the connector hydraulic seat being concave and a portion of a sphere having the same radius of curvature in a vertical direction as in a horizontal direction;

a plurality of hydraulic passages extending to a port terminating at the connector hydraulic seat;

the hydraulic seats seating against each other and the ports of the connector hydraulic seat registering with the ports of the mandrel hydraulic seat when the mandrel connector is connected to the mandrel;

a counterbore located at the port of each hydraulic passage of the connector hydraulic seat, defining a recessed base;

a seal element located in each counterbore and having a passage therethrough for the passage of hydraulic fluid from one of the ports of one of the connector members to another port of the other connector member, the seal element having a height slightly greater than the depth of the counterbore for compressing the seal element between the connector hydraulic seat and the base of the counterbore when the mandrel connector is connected to the mandrel; and retaining means for retaining the seal element in the counterbore prior to coupling the mandrel connector to the mandrel.

* * * * *